United States Patent [19]

Yamada et al.

[11] Patent Number: 5,170,317
[45] Date of Patent: Dec. 8, 1992

[54] MULTILAYER CAPACITOR

[75] Inventors: Kenichi Yamada; Kunio Tachi, both of Nagaokakyo, Japan

[73] Assignee: Murata Manufacturing Co., Ltd., Japan

[21] Appl. No.: 638,632

[22] Filed: Jan. 8, 1991

[30] Foreign Application Priority Data

Jan. 9, 1990 [JP] Japan .................................. 2-676[U]

[51] Int. Cl.$^5$ .......................... H01G 3/07; H01G 3/26
[52] U.S. Cl. ..................................... 361/321; 29/25.42
[58] Field of Search ................ 29/25.42; 361/320, 321

[56] References Cited

U.S. PATENT DOCUMENTS

| | | | |
|---|---|---|---|
| 3,648,132 | 3/1972 | Rayburn | 361/321 |
| 3,694,710 | 9/1972 | Kirschner | 361/321 |
| 3,721,871 | 3/1973 | Heron | 361/321 |
| 5,034,851 | 7/1991 | Monsorno et al. | 361/321 |

Primary Examiner—Donald A. Griffin
Attorney, Agent, or Firm—Ostrolenk, Faber, Gerb & Soffen

[57] ABSTRACT

A multilayer capacitor, in which a plurality of inner electrodes are arranged in a sintered body composed of dielectric ceramics so as to overlap each other while being separated by dielectric ceramic layers. A correction electrode for correcting the capacitance of the multilayer capacitor is arranged inside the sintered body so as to overlap one of the plurality of inner electrodes while being separated therefrom by a dielectric ceramic layer and is so constructed that the overlapping area thereof between the correction electrode and the one inner electrode is different from the overlapping area between the other inner electrodes, and the width of the correction electrode is smaller than that of the inner electrodes.

15 Claims, 4 Drawing Sheets

MULTILAYER CAPACITOR

BACKGROUND OF THE INVENTION

1. Field of the Invention

The present invention relates generally to a multilayer capacitor having a structure in which a desired capacitance can be achieved, and more particularly, to a multilayer capacitor which is provided with a correction electrode for correcting the capacitance of the multilayer capacitor.

2. Description of the Prior Art

It is well-known that in a multilayer capacitor, a plurality of inner electrodes can be arranged so as to overlap each other while being separated by dielectric ceramic layers. In such a multilayer capacitor, usually the number of the dielectric ceramic layers sandwiched between the inner electrodes is adjusted in order to obtain a desired capacitance. This number of dielectric ceramic layers n is generally calculated by the following equation:

$$n = (113 \times C \cdot t)/(\epsilon \cdot S)$$

where C denotes a capacitance value to be achieved (pF), t denotes the thickness of dielectric ceramic layer (mm), $\epsilon$ denotes a dielectric constant, and S denotes the effective overlapping area of the inner electrodes (mm$^2$).

As the result of making calculations using the foregoing equation so as to achieve a certain capacitance value C, however, the problem may rise that n is not an integer, for example, n=8.3.

When n is not an integer, the desired capacitance value C has been conventionally achieved by adopting the following methods.

First, a method has been adopted wherein n is rounded and a lot of multilayer capacitors having an integral number of layers formed therein is fabricated. Then a multilayer capacitor having the desired capacitance value C is selected from among the lot of multilayer capacitors fabricated. However, the center value of the distribution of capacitance values of the multilayer capacitors obtained by this method can be expected to deviate considerably from the desired capacitance value C. Consequently, the method has the disadvantage that the rate of acceptable products is significantly low.

Second, as shown in FIG. 2, the thickness may be increased of a dielectric ceramic layer between an inner electrode 5 and an inner electrode 6, for example, a plurality of inner electrodes 2 to 6 being arranged in a sintered body 1. For example, when n=8.3, a capacitance value close to the capacitance value C of the multilayer capacitor in which n=8.3 can be obtained by laminating the inner electrodes 2 to 5 whose number corresponds to the number of layers n=8.0 (some of the inner electrodes are omitted in FIG. 2) and interposing between the inner electrodes 5 and 6 a dielectric ceramic layer 7 having a thickness which is three times that of the dielectric ceramic layers between the other inner electrodes.

However, even if the above described dielectric ceramic layer 7 and inner electrode 6 are used, the desired capacitance value C corresponding to n=8.3 cannot be directly achieved. Accordingly, the method has the disadvantage that the rate of acceptable products is not satisfactory. Moreover, it must be arranged to provide the dielectric ceramic layer 7 having a different thickness from that of the other dielectric ceramic layers. Consequently, in the fabrication, a ceramic green sheet different from the other ceramic green sheets (having no electrode pattern formed therein) must be inserted. Therefore, the method also has the disadvantage that the fabricating processes are complicated.

Third, a structure has been known which includes an auxiliary electrode 16, as shown in FIGS. 3A and 3B. In this structure, inner electrodes 12 to 15 required to achieve a capacitance value in the case of n=8 are arranged in a ceramic sintered body 11. The auxiliary electrode 16 is provided which overlaps the inner electrode 15 while being separated therefrom by a dielectric ceramic layer. The auxiliary electrode 16 is constructed with a width equal to that of the other inner electrodes 12 to 15, but a length smaller than that of the other inner electrodes, as shown in FIG. 3B which is a longitudinal cross-section viewed from below, so that the overlapping area between the auxiliary electrode 16 and the inner electrode 15 becomes three-tenths of the overlapping area between the other inner electrodes.

Consequently, in the structure using the auxiliary electrode 16, a multilayer capacitor having a capacitance corresponding to the capacitance value C in the case where n=8.3 is obtained.

However, the structure using the auxiliary electrode 16 shown FIG. 3B has the disadvantage in that a multilayer capacitor having a desired capacitance cannot be obtained with high precision and stability because the capacitance value fluctuates very greatly if the position where the auxiliary electrode 16 is formed is slightly shifted in the direction of width W.

Furthermore, the dimensions of the multilayer capacitor are, in general, extremely small, and specifically the distance between the end surfaces of the sintered body 11 of the multilayer capacitor 10 is short. In such a very small component, therefore, it is extremely difficult to precisely overlap the auxiliary electrode 16 with the inner electrode 15 by a distance equal to 0.3× as shown in FIG. 3B, in that the overlapping area varies substantially in the direction of length L.

Therefore, even if a multilayer capacitor is fabricated so as to achieve as its objective the capacitance value corresponding to the case of n=8.3, the capacitance value of the multilayer capacitor obtained is nevertheless will vary over an appreciable range.

SUMMARY OF THE INVENTION

Accordingly, an object of the present invention is to provide a multilayer capacitor having a structure in which a desired capacitance value can be achieved with higher precision.

In the multilayer capacitor according to the present invention, a plurality of inner electrodes are arranged in a sintered body composed of dielectric ceramics so as to overlap each other while being separated by dielectric ceramic layers. A correction electrode for correcting the capacitance of the multilayer capacitor is provided so as to overlap one of the plurality of inner electrodes while being separated therefrom by a dielectric ceramic layer and so as to form an overlapping area different from the overlapping area of the other inner electrodes. The width of this correction electrode is made smaller than that of the inner electrodes.

If the direction of length is defined as the direction in which the inner electrodes extend from the end surfaces, to which outer electrodes are applied, of the sintered body, and the direction perpendicularly intersecting the direction of length is considered to be the direction of width, the "width" of the correction electrode and the width of the inner electrode is defined as the dimension in the above direction of width.

In the present invention, the width of the correction electrode is made smaller than the width of the inner electrode. Accordingly, even if the position where the correction electrode is formed is slightly shifted in the direction of width, the area of the region where the correction electrode overlaps with the inner electrode does not substantially fluctuate. Consequently, a desired corrected capacitance can be obtained with the correction electrode with high precision, thereby to obtain a multilayer capacitor having a desired capacitance stably and with high precision.

The foregoing and other objects, features, aspects and advantages of the present invention will become more apparent from the following detailed description of embodiments of the present invention when taken in conjunction with the accompanying drawings.

DESCRIPTION OF THE PREFERRED EMBODIMENTS

Figure 4:
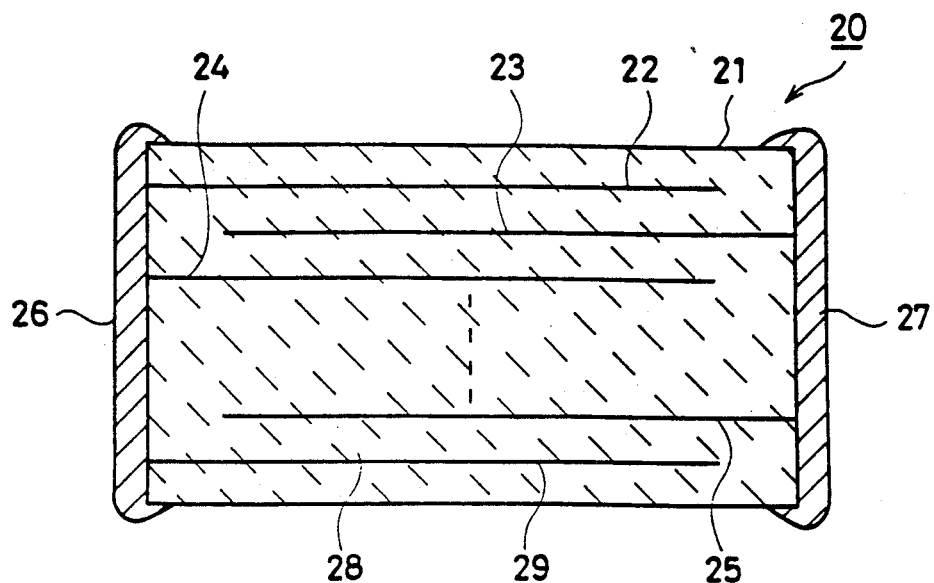
FIG. 4 is a cross sectional view showing a multilayer capacitor according to the first embodiment of the present invention.

FIG. 4 is a cross sectional view showing a multilayer capacitor according to one embodiment of the present invention. In a multilayer capacitor 20, a plurality of inner electrodes 22 to 25 are arranged in a sintered body 21 composed of dielectric ceramics so as to be overlapped with each other while being separated by dielectric ceramic layers. The plurality of inner electrodes 22 to 25 are alternately led out to end surfaces, which are opposed to each other, of the sintered body 21 in the direction of thickness of the sintered body 21.

Outer electrodes 26 and 27 are formed on the opposed end surfaces of the sintered body 21. Consequently, capacitances taken out by the dielectric ceramic layers between the plurality of inner electrodes 22 to 25 are connected in parallel between the outer electrodes 26 and 27.

Furthermore, below the lowermost inner electrode 25, a correction electrode 29 is arranged so as to be overlapped with the inner electrode 25 while being separated by a dielectric ceramic layer 28. The thickness of the dielectric ceramic layer 28 is made equal to the thicknesses of the dielectric ceramic layers between the inner electrodes 22 to 25. Consequently, a dummy ceramic green sheet used in constructing the dielectric ceramic layer 7 in the conventional example shown in FIG. 2 need not be prepared.

The present embodiment is characterized by the shape of the correction electrode 29.

As obvious from FIG. 4, the correction electrode 29 is constructed so as to have a length equal to those of the other inner electrodes 22 and 24 connected to the outer electrode 26.

However, as obvious from FIG. 1 which is a typical diagram as viewed through the sintered body 21 from below the correction electrode 29, the width of the correction electrode 29 is made considerably smaller than that of the inner electrode 25. Consequently, it is found that the area of a region where the correction electrode 29 is overlapped with the inner electrode 25 while being separated by the dielectric ceramic layer 28 (see FIG. 4) is made considerably smaller than the areas of regions where the inner electrodes 22 to 25 are overlapped with each other.

In the present embodiment, the width of the correction electrode 29 is made smaller so as to adjust the overlapping area of this correction electrode 29 with the inner electrode 25, that is, so as to set such an overlapping area that a desired capacitance value is obtained. For example, when it is desired to achieve the above described capacitance value C in the case of $n=8.3$, the width of the correction electrode 29 is set to three-tenths as large as the widths of the other inner electrodes 22 to 25, thereby to make it possible to achieve a capacitance due to $n=0.3$.

Moreover, the width of the correction electrode 29 is made smaller. Accordingly, even if the correction electrode 29 is formed with the position thereof being shifted in the W direction shown in FIG. 1, the overlapping area does not fluctuate provided that it falls within the width of the inner electrode 25. On the other hand, even if the correction electrode 29 is formed with the position thereof being shifted in the L direction shown in FIG. 1, the fluctuation range of the capacitance is significantly smaller than that in the conventional example shown in FIG. 2.

Accordingly, the correction of the capacitance in the multilayer capacitor can be made with high precision by using the narrow correction electrode 29.

Figure 2:
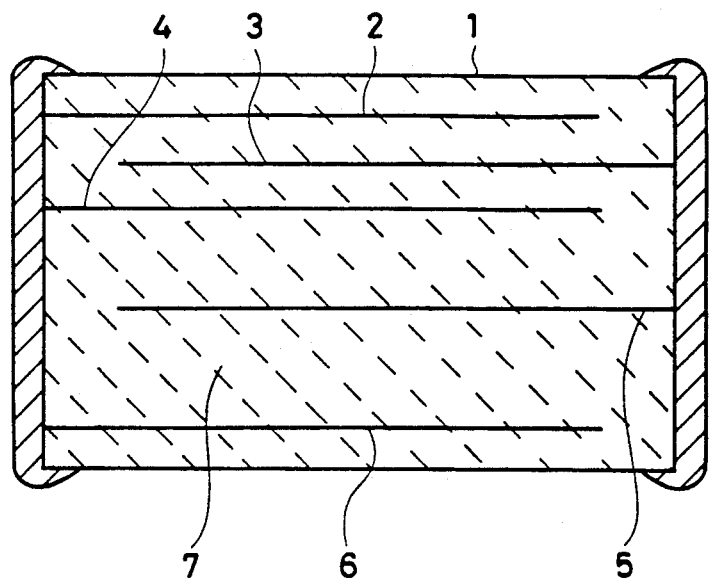
FIG. 2 is a cross sectional view for explaining one example of a conventional multilayer capacitor.
Figure 3A:
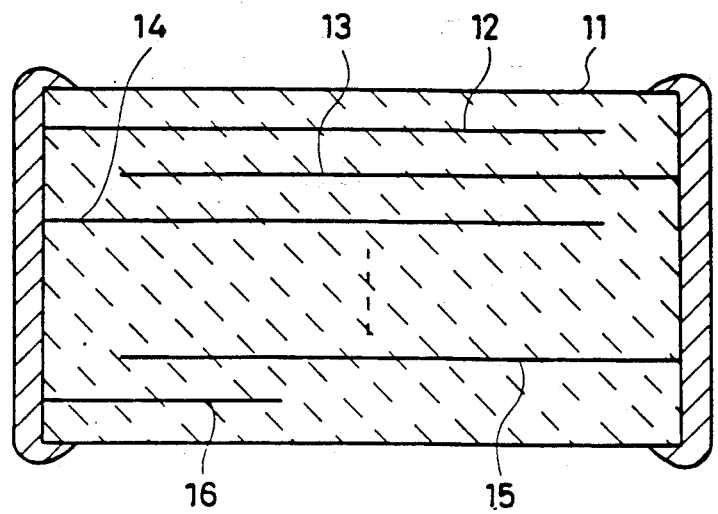
FIG. 3A is a cross sectional view for explaining another example of a conventional multilayer capacitor.
Figure 3B:
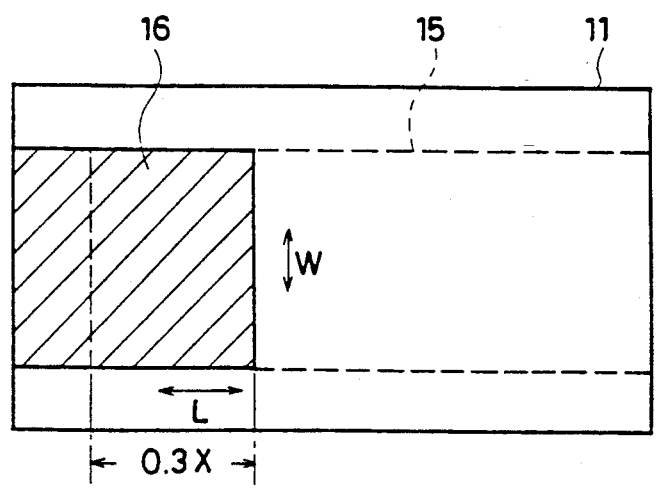
FIG. 3B is a schematic bottom view for explaining the shape of an auxiliary electrode in the conventional example shown in FIG. 3A.

The results of tests on the rate of acceptable products in the case of $n=5.3$ are as follows with respect to the above described cases, that is, the case of a rounding method, the case where a thick dielectric ceramic layer is formed as shown in FIG. 2, and the case where a correction electrode according to the present invention is used, respectively.

|  | rounding | dummy sheet | correction electrode |
|---|---|---|---|
| estimated rate of acceptable products | 0.6% | 77.9% | 81.6% |

Figure 1:
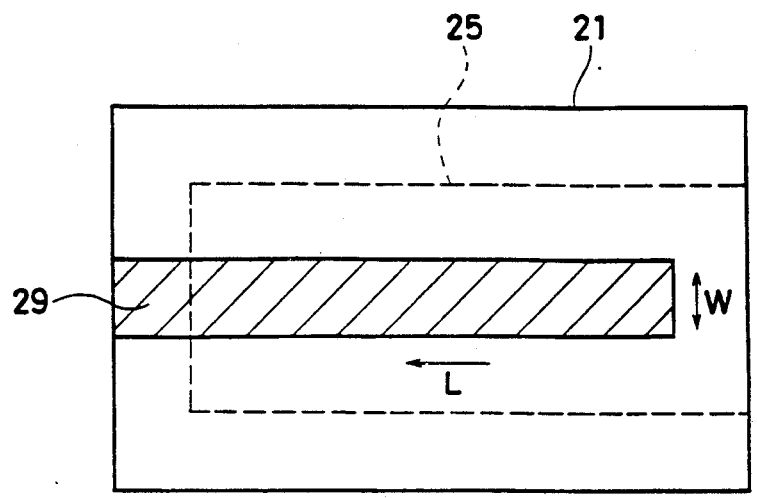
FIG. 1 is a schematic bottom view for explaining the respective relation between the shapes of a correction electrode and an inner electrode according to a first embodiment of the present invention.
Figure 5:
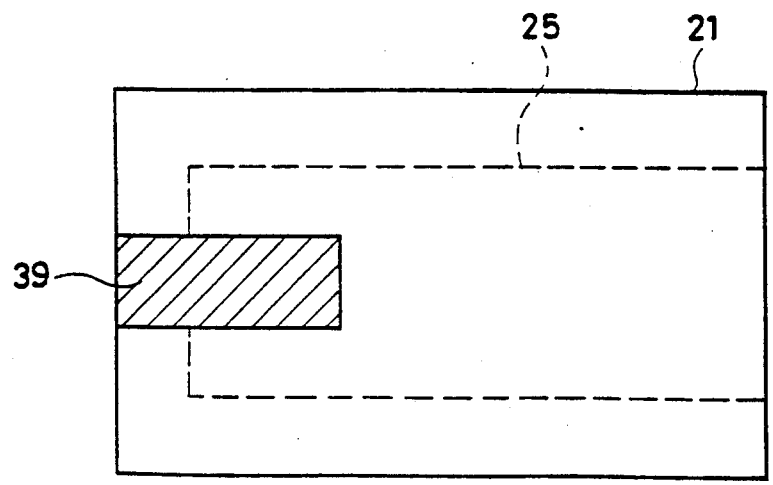
FIG. 5 is a schematic bottom view for explaining the respective shapes of a correction electrode and an inner electrode according to a second embodiment of the present invention.

FIG. 5 is a typical diagram for explaining another embodiment of the present invention, which corresponds to FIG. 1. Only the width of the correction electrode 29 is made smaller than that of the inner electrode 25 in the example shown in FIG. 1, while not only the width but also the length of a correction electrode 39 is made different from that of an inner electrode 25 in the embodiment shown in FIG. 5. More specifically, the overlapping area of the correction electrode with the inner electrode may be set by not only altering the width of the correction electrode but also altering the length thereof.

Figure 6A:
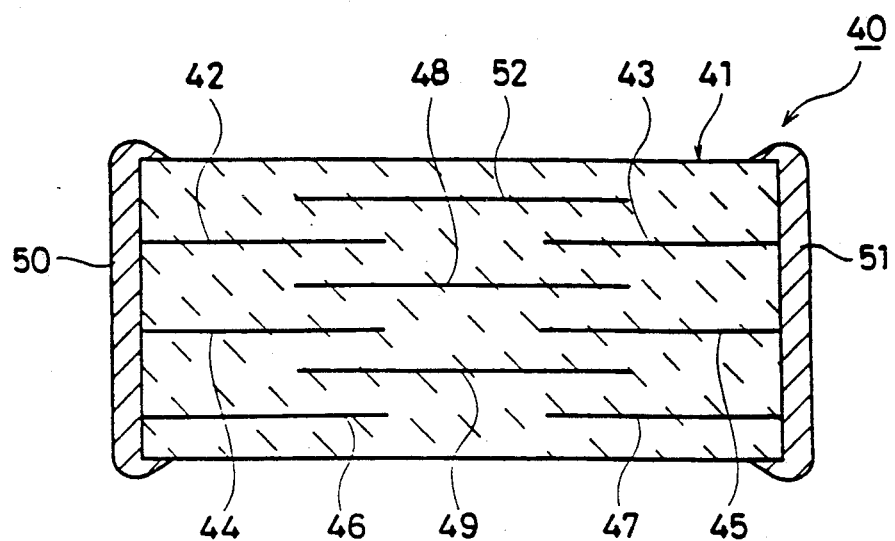
FIG. 6A is a cross sectional view for explaining a multilayer capacitor according to a third embodiment of the present invention.

FIG. 6A is a cross sectional view for explaining a third embodiment of the present invention. The third embodiment is applied to a multilayer capacitor having a structure in which a plurality of capacitances are connected in series. In a multilayer capacitor 40, inner electrodes 42 and 43, 44 and 45, and 46 and 47 respectively extending from both end surfaces of a sintered body 41 are arranged in the sintered body 41 in such a manner that they are got butted against each other by a predetermined distance in the center of the sintered body 41. Inner electrodes 48 and 49 are arranged in a central part of the sintered body 41 so as to be partially overlapped with the inner electrodes 42 to 47.

The inner electrodes 48 and 49 are partially overlapped with the inner electrodes 42 to 47 adjacent thereto so that the multilayer capacitor 40 has a structure in which a plurality of capacitances are connected in series between outer electrodes 50 and 51.

Figure 6B:
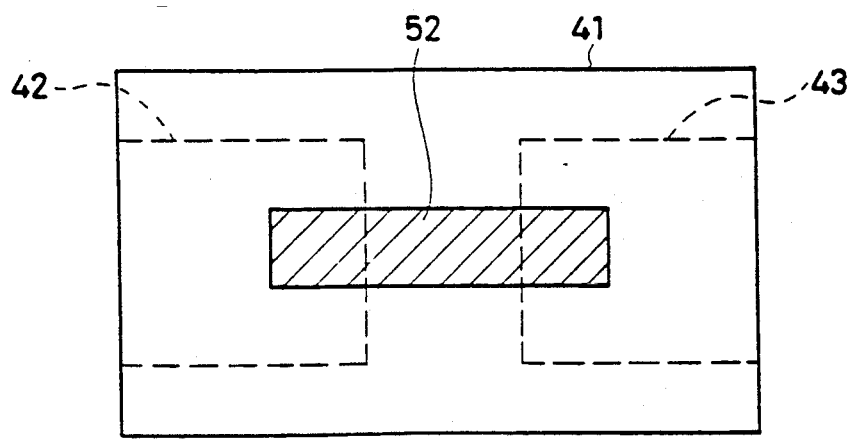
FIG. 6B is a schematic bottom view for explaining the respective shapes of a correction electrode and inner electrodes in the third embodiment shown in FIG. 6A.

Also in the multilayer capacitor 40, a correction electrode 52 which is overlapped with the inner electrodes 42 and 43 is arranged, thereby to make it possible to achieve a desired capacitance value. More specifically, in arranging the correction voltage 52 partially overlapped with the inner electrodes 42 and 43, the correction electrode 52 is constructed on the pattern narrower than those of the inner electrodes 42 and 43 as shown in FIG. 6B, thereby to make it possible to add a corrected capacitance. Also in this case, the width of the correction electrode 52 is made smaller than those of the inner electrodes 42 and 43. Accordingly, it is found that the corrected capacitance can be added with high precision in the same manner as that in the embodiment shown in FIG. 1.

Meanwhile, it goes without saying that also in the multilayer capacitor 40, the corrected capacitance can be adjusted by making not only the width but also the length of the correction electrode 52 different from that of the other inner electrode 48 or 49.

Although in the first to third embodiments, each of the correction electrodes 29, 39 and 52 is arranged outside a portion where the other inner electrodes are provided in the sintered body 41, the position where the correction electrode is formed may be in a portion where the inner electrodes are overlapped with each other. That is, the correction electrode need not be arranged outside the outermost inner electrode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multilayer capacitor comprising:
   a sintered body composed of dielectric ceramics;
   a plurality of inner electrodes arranged in said sintered body so as to be overlapped with each other while being separated by dielectric ceramic layers; and
   a correction electrode which is arranged in said sintered body substantially parallel to said plurality of inner electrodes, for correcting a capacitance of the capacitor to obtain a given desired capacitance, said connection electrode being arranged within said sintered body so as to be overlapped with one of said plurality of inner electrodes while being separated therefrom by a dielectric ceramic layer;
   the overlapping area between the correction electrode and said one inner electrode being different from the overlapping area between the inner electrodes; and
   the multilayer capacitor defining length, width and thickness dimensions, and the width of said correction electrode being smaller than the width of the one inner electrode, so that the correction electrode can be located at a plurality of positions overlapping said one inner electrode, said given desired capacitance being obtained in all of said plurality of positions.

2. The multilayer capacitor according to claim 1, wherein the length of said correction electrode is different from that of the inner electrode.

3. The multilayer capacitor according to claim 1, wherein said plurality of inner electrodes are alternately led out to a pair of end surfaces of the sintered body.

4. The multilayer capacitor according to claim 3, wherein said correction electrode is arranged outside the outermost inner electrode of said plurality of inner electrodes in the direction of thickness of the sintered body.

5. The multilayer capacitor according to claim 4, wherein the length of said correction electrode is substantially the same as that of said inner electrode.

6. The multilayer capacitor according to claim 4, wherein the length of said correction electrode is different from that of said inner electrode.

7. The multilayer capacitor according to claim 3, wherein the length of said correction electrode is different from that of said inner electrode.

8. The multilayer capacitor according to claim 3, further comprising a pair of outer electrodes formed respectively on said pair of end surfaces, said correction electrode being electrically connected to one of said outer electrodes.

9. The multilayer capacitor according to claim 3, wherein the length of said correction electrode is substantially the same as that of said inner electrode.

10. The multilayer capacitor according to claim 1, wherein
    said plurality of inner electrodes comprise a pair of inner electrodes extending from a pair of end surfaces of the sintered body into the sintered body and a further inner electrode formed so as to be overlapped with the pair of inner electrodes while being separated therefrom by a first dielectric ceramic layer, and not leading to said pair of end surfaces of the sintered body, and
    said correction electrode is formed so as to be overlapped with said pair of inner electrodes while being separated therefrom by a second dielectric ceramic layer arranged on the opposite side of said pair of inner electrodes from said first dielectric ceramic layer with said pair of inner electrodes being interposed between said first and second dielectric ceramic layers and not leading to said pair of end surfaces of the sintered body.

11. The multilayer capacitor according to claim 10, wherein the length of said correction electrode is made different from that of said inner electrode.

12. The multilayer capacitor according to claim 10, wherein the length of said correction electrode is substantially the same as that of said inner electrode.

13. The multilayer capacitor according to claim 1, wherein the length of said correction electrode is substantially the same as that of said inner electrode.

14. The multilayer capacitor according to claim 1, wherein the correction electrode is substantially centered in the width direction with respect to said one inner electrode.

15. The multilayer capacitor according to claim 1, wherein said correction electrode is arranged outside the outermost inner electrode of said plurality of inner electrodes in the direction of thickness of the sintered body; and wherein a dielectric ceramic layer of the sintered body continuously overlaps said correction electrode outside of said correction electrode in the direction of thickness of the sintered body.

* * * * *